United States Patent [19]
Korotky

[11] Patent Number: 4,865,408
[45] Date of Patent: Sep. 12, 1989

[54] LOW CROSSTALK REVERSED $\Delta\beta$ ELECTRODES FOR DIRECTIONAL COUPLER SWITCH

[75] Inventor: Steven K. Korotky, Toms River, N.J.

[73] Assignees: American Telephone and Telegraph Company, New York, N.Y.; AT&T Laboratories, Murray Hill, N.J.

[21] Appl. No.: 294,860

[22] Filed: Jan. 9, 1989

[51] Int. Cl.[4] .............................................. G02B 6/10
[52] U.S. Cl. ............................. 350/96.13; 350/96.14
[58] Field of Search ............... 350/96.11, 96.12, 96.13, 350/96.14

[56] References Cited

U.S. PATENT DOCUMENTS

| | | | |
|---|---|---|---|
| 4,012,113 | 3/1977 | Kogelnik et al. | 350/96.14 |
| 4,211,467 | 7/1980 | Cross et al. | 350/96.14 |
| 4,243,295 | 1/1981 | Alferness | 350/96.14 |
| 4,448,479 | 5/1984 | Alferness | 350/96.14 |
| 4,711,515 | 12/1987 | Alferness | 350/96.14 |

OTHER PUBLICATIONS

H. Kogelnik et al., IEEE J. of Quant. Elec., vol. QE-12, No. 7, Jul. 1976 "Switched Directional Couplers ...", pp. 396-401.
R. V. Schmidt et al., Optics Lett., vol. 2, No. 2, Feb. 1978, "Efficient Optical Waveguide ...", pp. 45-47.
R. C. Alferness, IEEE J. Quant. Elec., vol. QE-17, No. 6, Jun. 1981, "Guided-Wave Devices for Optical Communication", pp. 946-959.
L. McCaughan et al., J. of Lightwave Tech., vol. LT-4, No. 9, Sep. 1986, "Three-Electrode Ti: ...", pp. 1324-1327.
S. K. Korotky et al., Elec. Lett., vol. 22, No. 23, Nov. 6, 1986, "Control of Section-Asymmetry Crosstalk ...", pp. 1222-1224.
P. G. Suchoski et al., Elec. Lett., vol. 23, No. 25, Dec. 3, 1987, "Depolarization in Ti: ...", pp. 1357-1358.
J. Weber et al., IEEE J. of Quant, Elec., vol. 24, No. 3, Mar. 1988, "Crosstalk and Switching Characteristics ...", pp. 537-548.
T. K. Findakly et al., J. of Lightwave Tech., vol. 6, No. 1, Jan. 1988, "On the Crosstalk of Reversed—...", pp. 36-40.

Primary Examiner—Frank Gonzalez
Attorney, Agent, or Firm—Gregory C. Ranieri

[57] ABSTRACT

Crosstalk for a directional coupler switch employing a reversed $\Delta\beta$ electrode structure is reduced to a minimum by properly placing electrode sections over the waveguides to compensate interwaveguide coupling preceding an electrode section with interwaveguide coupling following the electrode section.

14 Claims, 1 Drawing Sheet

LOW CROSSTALK REVERSED Δβ ELECTRODES FOR DIRECTIONAL COUPLER SWITCH

TECHNICAL FIELD

This invention relates to electrooptic switching devices and, more particularly, to such devices employing reversed Δβ electrode structures.

BACKGROUND OF THE INVENTION

Optical communication systems generally operate by switching a plurality of signals over a multitude of routes for communication and other processing functions. To accomplish this end, directional couplers have been developed to perform the switching function under optical or electrical control.

One such directional coupler switch in prevalent use today is fabricated in LiNbO$_3$ material using an alternating Δβ or reversed Δβ, split electrode structure. See commonly assigned U.S. Pat. No. 4,012,113. This type of directional coupler switch includes an input transition region wherein two waveguides are bent toward each other to be in close proximity, an interaction region wherein optical energy transfer is electrooptically effected, and an output transition region wherein the two waveguides diverge from each other to eliminate interwaveguide coupling. In the interaction region, electrodes are split and separated by an insignificantly small gap. For this type of device, it is known that voltage adjustments can be employed to reduce crosstalk within certain limits in the straight-through ("bar") and crossover ("cross") states of the switch. However, crosstalk reduction techniques such as voltage adjustment on the reversed Δβ electrodes or the use of uniform Δβ electrode structures have only addressed crosstalk introduced in the interaction region of the directional coupler switch while essentially neglecting crosstalk introduced in the transition regions. As a result, such directional coupler switches have experienced intolerable crosstalk levels when the switches are cascaded in arrays.

SUMMARY OF THE INVENTION

Crosstalk for a directional coupler switch employing a reversed Δβ electrode structure is reduced to a minimum by properly placing electrode sections over the waveguides to compensate interwaveguide coupling preceding an electrode section with a substantially equal amount of interwaveguide coupling following the electrode section.

For a two-section, reversed Δβ electrode directional coupler switch, the electrode sections are substantially centered with respect to the length of the interaction region and are separated by a gap length, g. The gap length is selected to have an interwaveguide coupling which is twice as large as the interwaveguide coupling in either transition region provided that the transition regions are substantially identical in a mirror image manner.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

Figure 1:
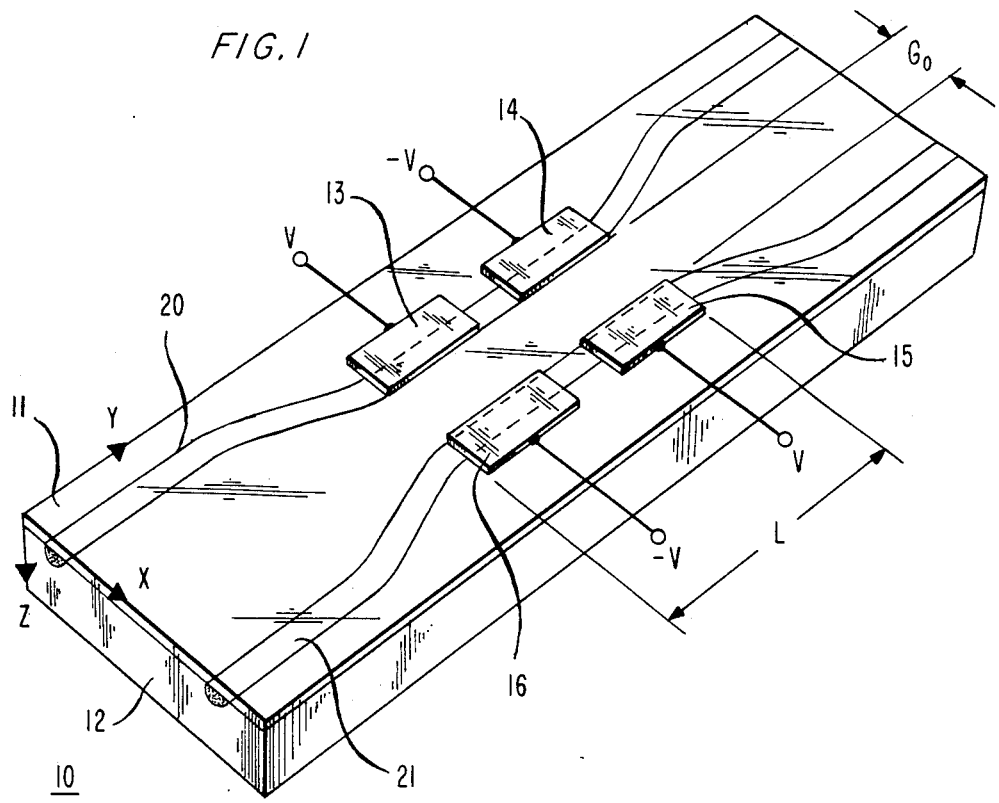
FIG. 1 is a reversed Δβ electrode directional coupler switch in accordance with the principles of the invention.

FIG. 1 is a directional coupler switch in accordance with the principles of the invention. Directional coupler switch 10 is configured in this exemplary embodiment with a two-section, reversed Δβ electrode structure having electrode sections 13, 14, 15 and 16 for controlling waveguides 20 and 21. Waveguides 20 and 21 are embedded in a birefringent, electrooptic substrate 12. Generally, waveguides 20 and 21 are separated from electrode sections 13 through 16 by an intermediate buffer layer 11 comprising insulating material. However, intermediate buffer layer 11 is not a required layer necessary for successful device operation. As such, intermediate buffer layer 11 may be omitted without any loss of generality or applicability of the principles of this invention.

In an active region, dielectric waveguides 20 and 21 are in a coupling relationship over a distance L which is commonly referred to as the device interaction length. The device interaction length is generally selected to be equal to or integrally greater than a coupling length, l, so that L=nl, n=1,2,3 . . . . A coupling length is the distance over which light travelling in one waveguide is completely transferred to the other waveguide, if the waveguides are properly phase-matched. This type of transfer occurs reversibly and in an oscillatory manner with each successive coupling length. Coupling strength per unit length κ depends upon waveguide parameters, the interwaveguide gap G$_o$, and the guided wavelength λ. The waveguides are fabricated in substantially identical manner so that they exhibit substantially identical propagation constants for at least one direction of signal polarization, that is, the transverse electric (TE) mode or the transverse magnetic (TM) mode. Accordingly, $\beta_{TE(20)}$ is approximately equal to $\beta_{TE(21)}$ for a device propagating the transverse electric mode or $\beta_{TM(20)}$ is approximately equal to $\beta_{TM(21)}$.

If a polarization insensitive device is desired, then fabrication should produce substantially identical propagation constants for each direction of signal polarization. That is, $\beta_{TE(20)}$ is approximately equal to $\beta_{TE(21)}$ and $\beta_{TM(20)}$ is approximately equal to $\beta_{TM(21)}$. For such a polarization insensitive device, minimization of the interwaveguide coupling in accordance with the principles of the invention is somewhat more difficult because the interwaveguide coupling is different for each polarization. As a result, balancing of the integrated interwaveguide coupling preceding an electrode section with an equal amount of integrated interwaveguide coupling following the electrode section is generally achieved for only one polarization while an unbalanced condition arises for the orthogonal polarization. In order to accommodate either polarization in the same directional coupler switch, it may be desirable to balance the integrated interwaveguide couplings for each polarization so that the composite unbalanced or uncompensated integrated interwaveguide coupling is locally minimized.

Methods for fabricating standard dielectric waveguide structures in birefringent, electrooptic material are well known in the art. See, for example, commonly assigned U.S. Pat. No. 4,400,052 and the art of record therein, as well as *J. Appl. Phys.*, vol. 49, pp. 4677–4682 (1987). Dopant diffusion parameters of primary interest include indiffused dopant concentration, dopant layer thickness prior to diffusion, diffusion time and diffusion temperature. For a lithium niobate or lithium tantalate device, titanium is the typical dopant employed in fabricating dielectric waveguides. This permits waveguides 20 and 21 to exhibit higher refractive indices than substrate 12 and buffer layer 11.

Electrode sections 13 through 16 are disposed over waveguides 20 and 21 by standard photolithographic masking, etching, and deposition techniques. Conductive materials such as metals and alloys are utilized to fabricate the electrodes. In one example, a thick aluminum layer ($\approx 2000$ Å) is evaporated over a thin sputtered chrome layer ($\approx 100$ Å) to realize electrode structures.

Waveguides for an exemplary directional coupler switch shown in FIG. 1 are made by diffusing titanium strips into z-cut, y-propagating lithium niobate substrate. Diffusion of 6 $\mu$m wide, 800 Å thick titanium strips is carried out at approximately 1025° C. for about 6 hours. The interaction length is approximately 9.0 mm while the interwaveguide separation G is about 8.5 $\mu$m. A buffer layer of silicon dioxide is deposited over the substrate and waveguides. As stated above, while the intermediate buffer layer is shown in FIG. 1, it is considered an optional element of the structure. Metallic electrodes are formed from chromium aluminum alloy over or adjacent to the waveguides.

The directional coupler in FIG. 1 operates by adjusting the phase mismatch between the waveguides via the linear electrooptic effect by application of voltage to the electrodes. To create sections of reversed or alternating $\Delta\beta$, positive supply voltage V is connected to electrode sections 13 and 15 wherein negative supply voltage $-V$ is connected to electrodes 14 and 16. Since the electric field reverses from one electrode section to the next, it is possible to effectively phase match the entire device. Variation of $\Delta\beta$ through electrooptic adjustment allows the device to operate in either the cross or bar states. Generally, switching from the cross to the bar state or vice versa requires changes of $\Delta\beta L$ of less than $2\pi$ with voltages between 0 and 5 volts. For additional information about setting proper voltages and operating the directional coupler switch, one is directed to U.S. Pat. No. 4,012,113 and *IEEE J. Quantum Electronics*, QE-13, pp. 396 et seq. (1976).

The electric field pattern applied to the electrode sections is designed so that the phase mismatch $\Delta\beta$ between the waveguides reverses N-1 times, where N is equal to the number of electrode sections over a waveguide and $\Delta\beta$ is defined as $2\pi(n_{20}-n_{21})/\lambda$ where $n_{20}$ and $n_{21}$ are the effective refractive indices for waveguides 20 and 21 and $\lambda$ is the optical wavelength supported for propagation by the waveguides. For the device shown in FIG. 1, the number of electrode sections N is equal to 2.

Figure 2:
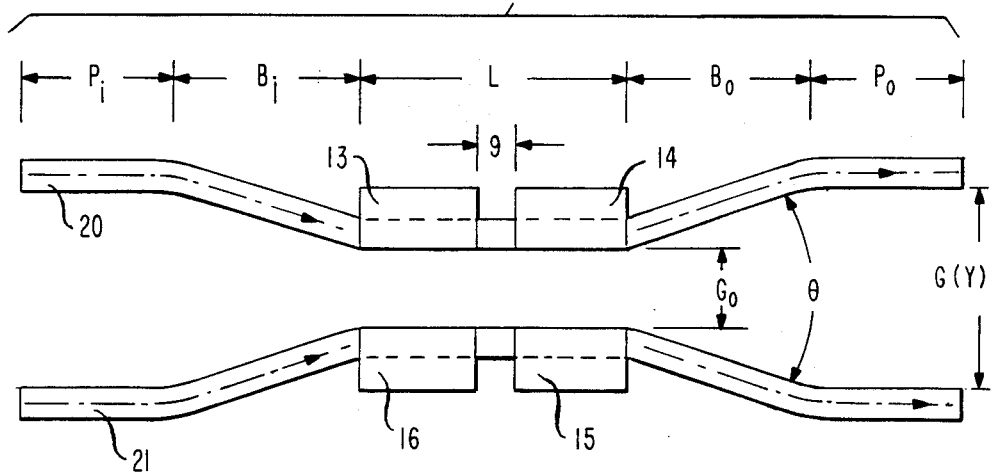
FIG. 2 is a schematic overview of the electrode and waveguide structure for the directional coupler of FIG. 1.

To further understand the device and the principles of the invention as applied thereto, attention should be directed to FIG. 2. FIG. 2 shows a schematic overview of the electrode and waveguide structures for the directional coupler switch of FIG. 1. In the overview, input and output transition regions are shown on opposite ends of the interaction region for each waveguide. Waveguides 20 and 21 are shown separated by distance S in the transition regions followed by gradually and spatially tapering toward each other at taper angle $\theta$ to achieve an ultimate separation $G_o$ in the interaction region. Between the transition regions is the interaction region of length L wherein the waveguides are in substantially parallel relationship over the entire interaction length.

For each region, it is possible to define the interwaveguide coupling strength $\kappa$ between waveguides which is a polarization sensitive parameter. This parameter is necessary for determining the crossover efficiency and, therefore, the amount of channel crosstalk for the directional coupler switch. Channel crosstalk is measured as the ratio of the optical power at the output end of the undesired guide to the optical power at the output end of the desired guide. Waveguide configurations as in the FIGs. and in U.S. Pat. No. 4,243,295 have been developed to achieve reasonably good channel isolation or low crosstalk for both polarizations by tapering the interwaveguide coupling coefficient from a minimum at one end of each transition region to a maximum in the interaction region. However, the present invention is applicable to these devices to reduce crosstalk further yet.

As shown in the FIGs., waveguides 20 and 21 have interwaveguide coupling coefficients $\kappa$ which taper from a small value or nominal minumum at the ends of the waveguides to a larger value or nominal maximum in the interaction region and generally over the interaction length L. In other words, the interwaveguide coupling coefficient or strength varies along the total length of the switched directional coupler 10 according to the approximate relationship, $$\kappa(y) = \kappa_0 e^{-D(y)/\gamma}. \tag{1}$$

For the equation given above, waveguide 20 is tapered toward waveguide 21 in the input transition region and away from waveguide 21 in the output transition region such that the distance from waveguide 20 to waveguide 21 is given as a function of y by G(y), where y is the distance along the guides in the direction of propagation. It should be noted that the parameter $\gamma$ is known as the lateral waveguide evanescent penetration depth. To determine crosstalk or crossover efficiency, s, it is necessary to integrate the coupling strength over the total device distance as $$S = \int_{-T/2}^{T/2} \kappa(y) dy, \tag{2}$$

where the total device distance is given as $T = P_i + B_i + L + B_o + P_o$.

The input transition region includes a parallel input region of length $P_i$ and a bend input region of length $B_i$. In the parallel input region, waveguides 20 and 21 are separated by a distance greater than $G_o$ over a length $P_i$. In the input bend region, waveguides 20 and 21 converge toward each other at an angle of $\theta/2$ or a total taper angle of $\theta$ degrees to reach a separation $G_o$. The output transition region includes a parallel output region of length $P_o$ and a bend output region of length $B_o$. In the parallel output region, waveguides 20 and 21 are separated by a distance greater than $G_o$ over a length $P_o$. In the output bend region, waveguides 20 and 21 diverge from each other at an angle of $\theta/2$ or a total taper angle of $\theta$ degrees going from a separation $G_o$ to reach a separation greater than $G_o$ in the parallel output region.

It is generally understood that the waveguides are separated by some large distance at each end of the device to allow coupling to fibers. Hence, the waveguides are usually separated by at least the diameter of an appropriate optical fiber.

In the interaction region, electrode sections over the same waveguide are separated from each other by a gap of length g measured along the direction of optical propagation in the underlying waveguide. For example, electrode sections 13 and 14 are separated from each other by gap of length g. Similarly, electrode sections 15 and 16 are separated from each other by gap of length g. In general, electrode sections 13 through 16 have substantially equal lengths.

In accordance with the principles of this invention, crosstalk is reduced by disposing electrode sections over each waveguide to be separated by a gap of length g which is chosen to compensate interwaveguide coupling that precedes the particular electrode section. In selecting a proper gap length for a two section reversed $\Delta\beta$ electrode, it is desirable to have the integrated interwaveguide coupling strength over the entire gap substantially equal to the total integrated interwaveguide coupling strength for the input and output transition regions. Expressed mathematically, this relationship is as follows, $$\int_{-g/2}^{g/2} \kappa(y)dy = \int_{-T/2}^{P_1+B_1-T/2} \kappa(y)dy + \int_{T/2-P_o-B_o}^{T/2} \kappa(y)dy. \qquad (3)$$

In the case where the transition regions are substantially identical with respect to design parameters and, thereby, integrated interwaveguide coupling strength, it is possible to bisect the gap and restate the relationship of the electrode sections to the waveguides as one in which the integrated interwaveguide coupling on one side of an electrode section is substantially equal to half of the integrated interwaveguide coupling on the opposite side of that electrode section measured along the length of the gap.

Generally, electrooptic devices such as the present directional coupler switch are fabricated to be symmetric with respect to topology and waveguide parameters about center lines transverse and longitudinal with respect to the propagation direction. Such symmetry applies when the number of electrode sections increases to three and above. While the complexity of such devices is increased with an increase in the number of electrode sections, the principles of the invention apply with equal force. For an electrode structure having three sections, it is possible to compensate interwaveguide coupling by disposing the electrode sections far enough apart to satisfy the following mathematical relationship:

$$\int_{-g_1/2}^{g_1/2} \kappa(y)dy = \int_{-T/2}^{P_1+B_1-T/2} \kappa(y)dy + \qquad (4)$$

$$\int_{T/2-P_o-B_o}^{T/2} \kappa(y)dy = \int_{-g_2/2}^{g_2/2} \kappa(y)dy,$$

where $g_1$ and $g_2$ are the respective lengths for the gaps between the first and second electrode sections and the second and third electrode sections, respectively.

Various electrode configurations are contemplated for the directional coupler switch. For example, one embodiment may include a multi-section, reversed $\Delta\beta$ electrode over one waveguide with a single long ground plane electrode over the adjacent waveguide. See, for example, U.S. Pat. No. 4,711,515. In another contemplated embodiment, the three electrodes may be disposed to meander back and forth over the two waveguides so that the polarity of the applied voltage reverses from one region to the next. See, for example, *Optics Lett.*, Vol. 2, No. 2, pp. 45-7 (1978).

While the reversed $\Delta\beta$ has been explained hereinabove with respect to split or sectionalized electrode sections, it is contemplated that the principles of the invention apply equally to any means, whether electrical, optical or acoustic, which is capable of affecting a refractive index change in one waveguide relative to the other. The region in which the change is affected is then analogous to the above-described electrode section. In a contemplated optical index changing element, reversed $\Delta\beta$ may be possible by illuminating alternate regions of the transition region of the device and omitting the illumination for every other region over the same waveguide.

It should be clear to those skilled in the art that these and other modifications can be made to the embodiment of the invention described hereinabove without departing from the spirit and scope of the invention. For example, it is possible to position one or more intermediate electrode sections between the two end electrode sections for a three- or greater-section electrode structure so that the interwaveguide coupling preceding the intermediate electrode section by an equal amount of interwaveguide coupling following the intermediate electrode section, wherein the interwaveguide coupling, while balanced for a particular electrode section, is different from electrode section to electrode section.

I claim:

1. A directional coupler switch comprising first and second transition regions and an interaction region therebetween, first and second dielectric waveguides for supporting optical signal propagation having an interwaveguide coupling coefficient that tapers from a minimum at one end of each waveguide in each transition region to a maximum in the interaction region, said waveguides being substantially phase matched to each other for similar optical signal polarizations;

means for impressing voltages across selected portions of said waveguides in said interaction region, said voltage impressing means including both first and second electrodes extending substantially over the first and second waveguides, respectively, each electrode including at least first and second sections electrically disconnected from each other; and said electrode sections separated by a gap having a predetermined length to cause an integral of said interwaveguide coupling coefficient along said predetermined length to be equal to an integral of said interwaveguide coupling coefficient along said first and second transition regions.

2. The directional coupler switch as defined in claim 1 further including a buffer layer of insulating material intermediate said waveguides and said first and second electrodes.

3. A directional coupler switch comprising first and second transition regions and an interaction region therebetween,
   first and second dielectric waveguides for supporting optical signal propagation having an interwaveguide coupling coefficient that varies in accordance with a predetermined function along a direction of optical signal propagation, said dielectric waveguides being substantially phase matched to each other for at least one optical signal polarization;
   means for impressing voltages across selected portions of said waveguides in said interaction region, said voltage impressing means including both first and second electrodes extending substantially over the first and second waveguides, respectively, at least said first electrode including at least first and second sections electrically disconnected from each other; and
   said electrode sections separated by a gap having a predetermined length to cause an integral of said interwaveguide coupling coefficient along said predetermined length to be equal to an integral of said interwaveguide coupling coefficient along said first and second transition regions.

4. The directional coupler switch as defined in claim 3 further including a buffer layer of insulating material intermediate said waveguides and said first and second electrodes.

5. The directional coupler switch as defined in claim 3 wherein said predetermined function causes the interwaveguide coupling coefficient to taper from a minimum at one end of the waveguides in each transition region to a maximum in the interaction region.

6. The directional coupler switch as defined in claim 5 further including a buffer layer of insulating material intermediate said waveguides and said first and second electrodes.

7. A directional coupler switch comprising first and second transition regions and an interaction region therebetween,
   first and second dielectric waveguides for supporting optical signal propagation having an interwaveguide coupling coefficient that varies in accordance with a predetermined function along a direction of optical signal propagation, said dielectric waveguides being substantially phase matched to each other for at least one optical signal polarization;
   means for changing an index of refraction in one waveguide relative to the other waveguide in at least first and second adjacent regions along the length of said waveguides in said interaction region, each region being separated from a next adjacent region by a gap; and
   said gap having a predetermined length to cause an integral of said interwaveguide coupling coefficient along said predetermined length to be equal to an integral of said interwaveguide coupling coefficient along said first and second transition regions.

8. The directional coupler switch as defined in claim 7 wherein said predetermined function causes the interwaveguide coupling coefficient to taper from a minimum at one end of the waveguides in each transition region to a maximum in the interaction region.

9. The directional coupler switch as defined in claim 8 further including a buffer layer of insulating material intermediate said waveguides and said means for changing an index of refraction.

10. A directional coupler switch comprising first and second transition regions and an interaction region therebetween,
    first and second dielectric waveguides for supporting optical signal propagation having an interwaveguide coupling coefficient that varies in accordance with a predetermined function along a direction of optical signal propagation, said dielectric waveguides being substantially phase matched to each other for at least one optical signal polarization;
    means for changing an index of refraction in one waveguide relative to the other waveguide in first, second and third adjacent regions disposed successively along the length of said waveguides in said interaction region, said first and second regions separated by a first gap and said second and third regions separated by a second gap; and
    said first and second gaps having substantially equal predetermined lengths to cause an integral of said interwaveguide coupling coefficient along said predetermined length of said first gap to be at least equal to an integral of said interwaveguide coupling coefficient along said first transition region.

11. The directional coupler switch as defined in claim 10 wherein said predetermined function causes the interwaveguide coupling coefficient to taper from a minimum at one end of the waveguides in each transition region to a maximum in the interaction region.

12. The directional coupler switch as defined in claim 11 further including a buffer layer of insulating material intermediate said waveguides and said means for varying the index of refraction.

13. The directional coupler switch as defined in claim 11 wherein said predetermined length of said second gap is sufficient to cause an integral of said interwaveguide coupling coefficient along said predetermined length of said second gap to be at least equal to an integral of said interwaveguide coupling coefficient along said second transition region.

14. The directional coupler switch as defined in claim 13 wherein said means for changing an index of refraction includes means for impressing voltages across said waveguides in first, second and third regions, said voltage impressing means including both first and second electrodes extending substantially over the first and second waveguides, respectively, at least said first electrode including first, second and third sections electrically disconnected from each other, said first, second and third sections individually associated with said first, second and third regions, respectively.

* * * * *